H. S. THOMAS AND W. R. DAVIES.
MACHINERY OR APPARATUS TO BE USED IN THE MANUFACTURE OF TINPLATES AND OTHER METAL COATED PLATES OR SHEETS.
APPLICATION FILED APR. 19, 1920.

1,432,578. Patented Oct. 17, 1922.

Inventors:—
Hubert S. Thomas
William R. Davies
by
Attorney

H. S. THOMAS AND W. R. DAVIES.
MACHINERY OR APPARATUS TO BE USED IN THE MANUFACTURE OF TINPLATES AND OTHER METAL COATED PLATES OR SHEETS.
APPLICATION FILED APR. 19, 1920.

1,432,578.

Patented Oct. 17, 1922.
2 SHEETS—SHEET 2.

Inventors:—
Hubert S. Thomas
William R. Davies
by
Attorney

Patented Oct. 17, 1922.

1,432,578

UNITED STATES PATENT OFFICE.

HUBERT SPENCE THOMAS, OF LLANDAFF, NEAR CARDIFF, AND WILLIAM ROBERT DAVIES, OF WHITCHURCH, NEAR CARDIFF, WALES.

MACHINERY OR APPARATUS TO BE USED IN THE MANUFACTURE OF TINPLATES AND OTHER METAL-COATED PLATES OR SHEETS.

Application filed April 19, 1920. Serial No. 374,960.

*To all whom it may concern:*

Be it known that we, HUBERT SPENCE THOMAS and WILLIAM ROBERT DAVIES, subjects of the King of Great Britain, residing at Llandaff, near Cardiff, and Whitchurch, near Cardiff, Wales, respectively, have invented certain new and useful improvements in or relating to machinery or apparatus to be used in the manufacture of tinplates and other metal-coated plates or sheets, of which the following is a specification.

The said invention relates to machinery or apparatus to be used in the manufacture of tinplates and other like metal coated plates and sheets and more especially to continuous machines of the continuous type wherein the plates or sheets are automatically carried through the several processes of pickling, swilling, tinning and finishing comprised in the manufacture of tinplates and the like, but we wish it to be understood that our invention may be applied to pickling machines generally in which the plates or sheets are individually or separately pickled instead of being treated in bulk.

In order that our invention may be the better understood we remark that in some tinplate works a much longer treatment of the plates or sheets in the pickling bath than is obtained when the tinplates are manufactured by the continuous machines as heretofore constructed is thought necessary, and the object of the present invention is to provide for a longer individual treatment of the plates or sheets in the pickling bath without increasing the size of the plant or machinery and while preserving the machinery in continuous operation. This we effect by the employment of the improved construction of wheel carriers hereinafter described which rotate in the pickling bath and carry the plates or sheets therethrough.

The improved wheel carriers constituting the primary feature of our present invention each has a series of gaps, recesses or pockets for the reception of the plates or sheets, the plates or sheets being received on the arms of the said wheels on and by which arms the said plates or sheets are carried through the pickling bath. The construction and arrangement of parts is such that the plates or sheets which are introduced or fed into the pockets or recesses of the wheel carriers singly, that is to say, one in each pocket or recess, are situated over the plates or sheets in the preceding pockets or recesses on the same side of the wheel carriers the plates or sheets being preserved apart by the arms of the wheel carriers which thereby ensure individual or separate treatment of the plates or sheets when in the pickling acid.

We will further describe our invention in connection with the accompanying drawings.

Figure 1 represents in longitudinal section pickling apparatus containing the improvements constituting our invention the said pickling apparatus being shown in conjunction with a mechanical plate or sheet feeding appliance of the kind described, represented and claimed in the complete specifications of U. S. Patents Nos. 1,207,662 and 1,252,198.

The same letters of reference indicate the same parts in the several figures of the drawings.

Figure 1:
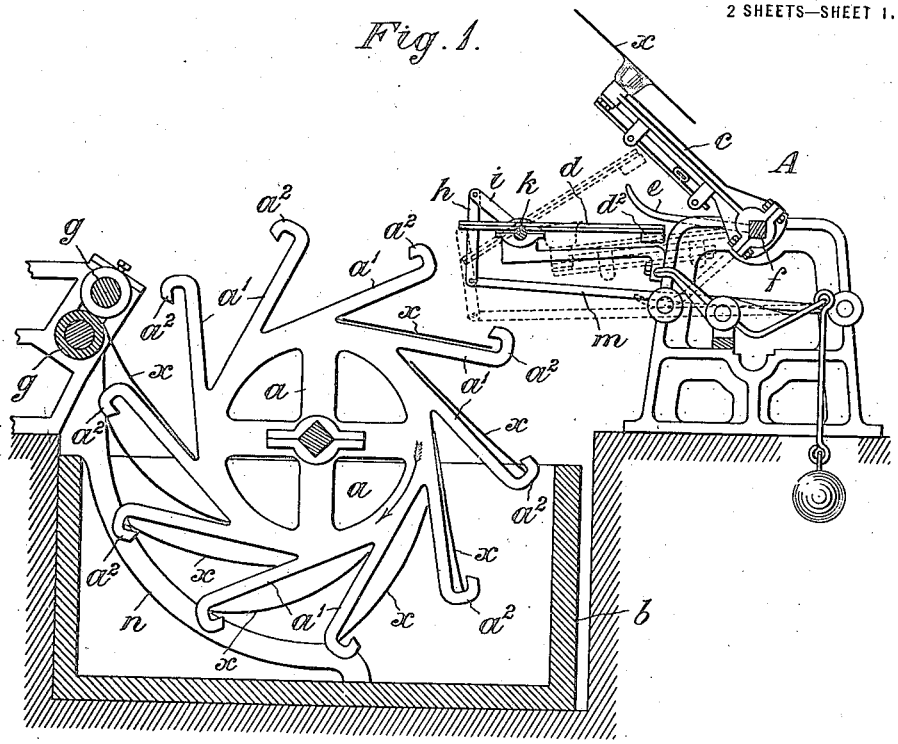
Figure 2:
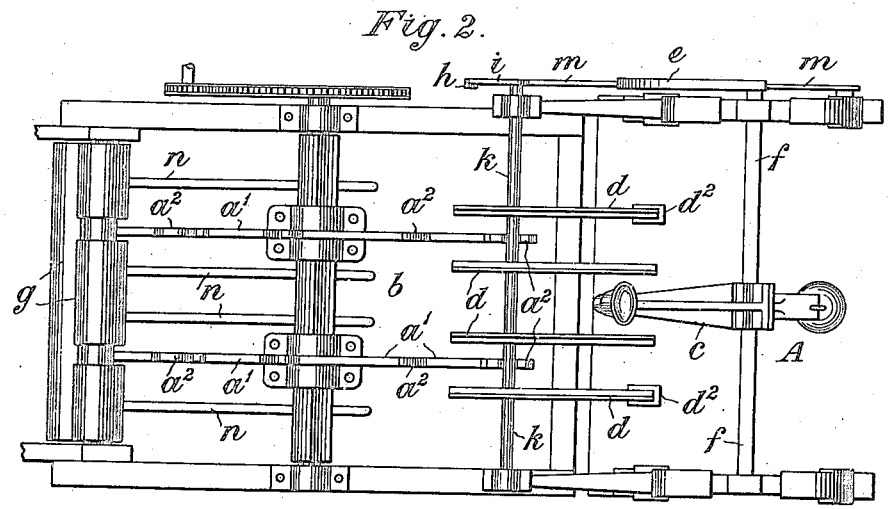
Figure 2 is a plan of the arrangement represented in Figure 1.

We will first describe the arrangement Figures 1 and 2.

$a, a$ are the wheel carriers which rotate in the pickling bath $b$ the said wheels $a$ having a series of pockets, gaps or recesses formed by the arms $a^1$ which project tangentially or nearly tangentially from a central part of each wheel $a$ the said arms $a^1$ terminating at their free ends in hooks $a^2$.

The plates or sheets marked $x$ are fed into the gaps, recesses or pockets of the wheels $a$ preferably by mechanical means, such for example as the machine A which is of the kind described, represented and claimed in the complete specifications of U. S. Patents Nos. 1,207,662 and 1,252,198, the plates or sheets being received on the arms $a^1$ of the wheel carriers $a$.

We wish it however to be understood that we do not limit ourselves to any particular mechanical feed device and if desired a mechanical feed may be dispensed with the plates or sheets being introduced into the gaps, pockets or recesses of the wheel carriers by hand.

Where the sucker carrying arm $c$ is employed in a mechanical feed arrangement the sucker on the backward swing of the rocking arms $c$ is brought on to the uppermost plate or sheet in a pile of plates or sheets (not shown) at the front of the machine and on the forward swing of the said arm $c$ the plate or sheet carried over by the sucker is transferred to the pivoted arms $d$ the sucker carrying arm $c$ passing between the middle pair of arms $d$ and below the same as is indicated in dotted lines in Figure 1.

When the sucker carrying arm is near the end of its forward swinging or rocking motion an arm $e$ on the shaft $f$ on which the sucker carrying arm $c$ is fixed comes into contact with a lever $m$ the end of which is connected by the link $h$ with a crank or arm $i$ on the end of the shaft $k$ on which the arms $d$ are fixed, consequently by the continued motion of the sucker carrying arm $c$ in the forward direction the arm $e$ depresses the lever $m$ and effects through the link $h$ and arm or crank $i$ the turning of the shaft $k$ in the direction proper for causing the arms $d$ to tilt into the position indicated in dotted lines in Figure 1. In this position of the arms $d$ the sucker carrying arm or lever $c$ is below the tilted arms $d$, $d$ and the plate or sheet carried by the sucker is transferred to the said arms and slides down the same into the gap, recess or pocket of the wheels $a$ presented to the tilted arms $d$. When the sucker carrying arm $c$ is passing between the arms $d$ in the forward direction for transferring the plate or sheet to the said arms the valve of the sucker is opened against the action of its spring for the admission of air to the said sucker and release of the plate or sheet.

On the back motion of the sucker carrying arm or lever $c$ the arms $d$ return into their normal position under the action of the weights $d^2$ on the ends of the said arms the motion of the tilting arms $d$ being limited by stops not shown.

The wheels $a$ are rotated in the direction of the arrow in Figure 1 at such a speed that a fresh gap, pocket or recess in the said wheels $a$ is presented to the tilted arms $d$ on each forward swinging motion of the sucker carrying arm or lever $c$ and a plate or sheet on the other side of the wheels $a$ is simultaneously carried into the nip of the rolls $g$, $g$ by which the pickled plates or sheets are carried forward to the swilling device or appliance of the continuous machine.

By the construction and arrangement of parts hereinbefore described and illustrated a greater number of plates or sheets can be simultaneously treated in the pickling bath without increasing the size of the said bath and the plates or sheets are carried therethrough much slower than in pickling baths with wheel or disc-like carriers as heretofore constructed hence a longer pickling action results. Further, the plates or sheets $x$ in the gaps, pockets or recesses of the wheels $a$ (Figures 1 and 2) as they approach the level of the pickling acid and descend therein become more and more inclined until they pass the perpendicular when the plates or sheets leave the arms of the wheels $a$ on which they were supported and come into contact with the next following arms forming the other side of the V shaped recesses, gaps or pockets in the wheels $a$ in which the said plates or sheets are confined. By the continued motion of the wheels $a$ the edge of the plate or sheet which is in contact with the curved rail or guide $n$ in the acid bath becomes the forward edge of the plate or sheet $x$ and thus the edge which was the first to enter the acid is the first to leave the acid and further the plates are inverted in their passage through the bath a uniform pickling of the plates being thereby ensured.

Figure 3:
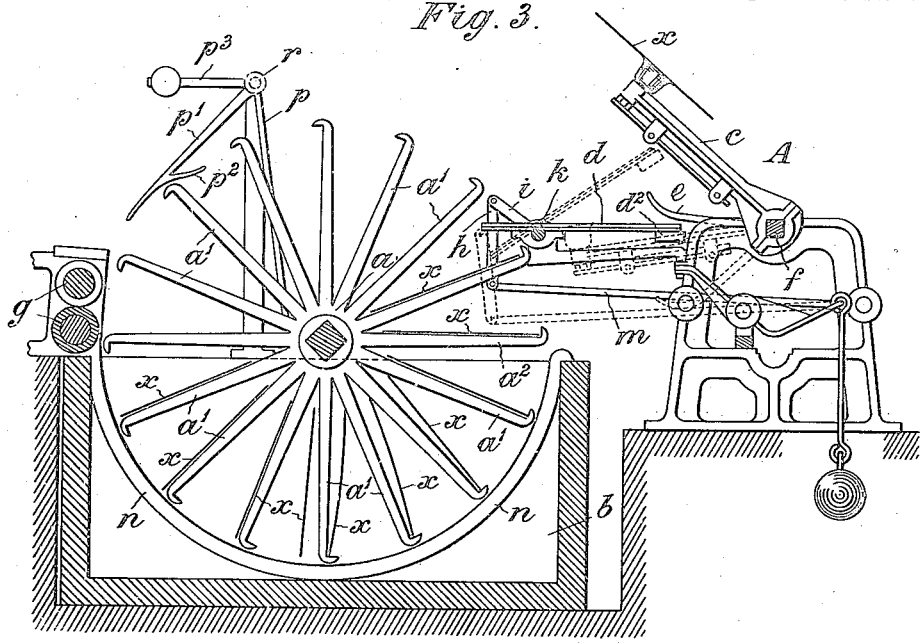
Figures 3 and 4 are similar views of a modified arrangement of the said invention hereinafter particularly described.
Figure 4:
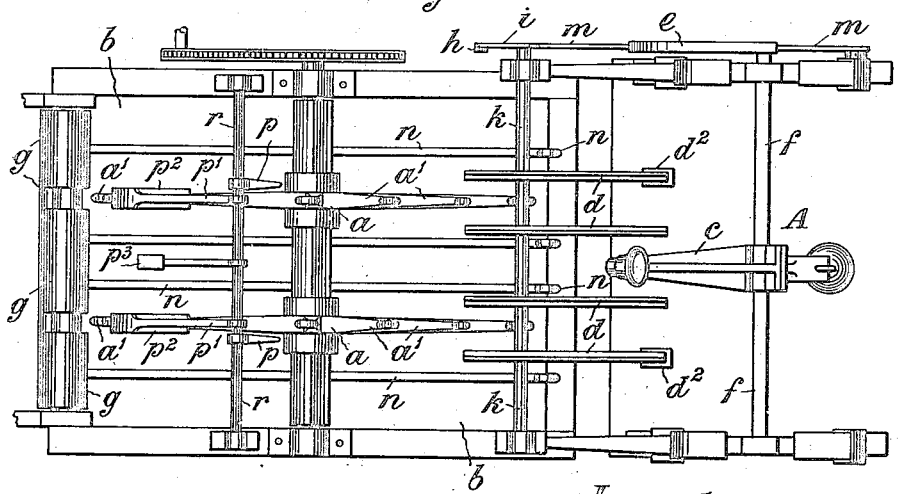

Although we prefer the construction and arrangement of parts hereinbefore described with reference to Figures 1 and 2 we wish it to be understood that we do not limit ourselves thereto as the same may be varied without departing from the principal feature of the invention. For example, we may modify the shape of the wheels or discs $a$ as is illustrated in Figures 3 and 4 but it should be noted that in this case the edges of the plates or sheets adjacent the hooked ends of the arms $a^1$ which are the first to enter the pickling acid are the last to leave the said acid and mechanical means are required to transfer the plates or sheets from the gaps, recesses or pockets in the wheels $a$ into the nip of the rolls $g$ which are to carry the plates or sheets toward the swilling device or appliance. The mechanical means for removing the plates or sheets from the gaps, recesses or pockets of the wheels $a$ illustrated in Figures 3 and 4 consist of lever devices having arms $p$, $p^1$, the arm $p^1$ being situated in the same plane as the wheels $a$. Each arm $p^1$ has a projecting horn $p^2$ against which the radial arms of the wheels $a$ are brought by the rotation of the said wheels, the levers $p$, $p^1$ being thereby turned or moved outward, the arms $p$, $p$ which are engaging the inner edge of one of the plates or sheets being thereby made to push the said plate or sheet out of the gap, recess or pocket into the nip of the rolls $g$ by which the plate or sheet is seized and carried forward.

When the arms $a^1$ of the wheels $a$ pass from beneath the horns $p^2$ of the arms $p^1$ of the lever devices comprising the arms $p$ and $p^1$, the said lever devices are caused to drop by the action of the weighted arm $p^3$ secured on the shaft $r$ to which the said lever devices are also fixed.

Although we have described our new or improved pickling apparatus in combination with a mechanical plate or sheet feeding appliance we wish it to be understood that the plates or sheets may be introduced into the gaps, recesses or pockets of the wheels $a, a$ by hand.

We claim—

1. An apparatus for pickling metallic plates or sheets comprising a tank, a shaft mounted to rotate above the liquid level in said tank, and a plurality of arms projecting from said shaft in alined pairs and each provided with sheet edge-engaging means, each alined pair of arms forming with an adjacent pair of arms a pocket to receive a sheet edgewise with the sheet edge-engaging means of said alined pair of arms in engagement with one edge of said sheet.

2. An apparatus for pickling metallic plates or sheets comprising a tank, a shaft mounted to rotate above the liquid level in said tank, a plurality of arms projecting from said shaft in alined pairs and each provided with sheet edge-engaging means, each alined pair of arms forming with an adjacent pair of arms a pocket to receive a sheet edgewise with the sheet edge-engaging means of said alined pair of arms in engagement with one edge of said sheet, and means to cause said sheet to leave said pockets as said arms rise from said tank after passing therethrough.

3. An apparatus for pickling metallic plates or sheets comprising a tank, a shaft mounted to rotate above the liquid level in said tank, a plurality of arms projecting tangentially from said shaft in alined pairs and each provided with sheet edge-engaging means, each alined pair of arms forming with an adjacent pair of arms a pocket to receive a sheet edgewise with the sheet-engaging means of said alined pair of arms in engagement with one edge of said sheet.

4. An apparatus for pickling metallic plates and sheets, comprising a pickling bath, rotating wheel carriers mounted in the said bath and consisting of wheel-like devices each having a plurality of straight arms arranged in radial spaced relation and provided with outer terminal plate or sheet retaining means, and a series of curved guides between which the outer extremities of the arms have movement, the carriers overturning the sheets or plates in the bath and causing said sheets or plates to engage the said guides and be discharged from the bath.

5. An apparatus of the class specified, comprising a bath, rotatable sheet or plate dipping devices of wheel-like form movable in the bath, each wheel-like device comprising a series of tangentially arranged straight arms having outer hooked ends forming unobstructed pockets in which the sheets or plates are successively fed, the sheets or plates being overturned during their movement through the bath while in engagement with the arms and also free to have sufficient movement to expose both sides of each sheet or plate to the pickling liquid.

6. An apparatus of the class specified, comprising a pickling bath, rotatable carriers disposed for operation in the bath consisting of a plurality of tangentially arranged straight arms having outer terminal devices for loosely holding and retaining sheets or plates in spaced relation and with such looseness as to permit both sides of each sheet or plate to be subjected to the pickling liquid in the bath, and means for successively feeding metal sheets or plates to the arms.

In testimony whereof we have hereunto set our hands.

HUBERT SPENCE THOMAS,
WILLIAM ROBERT DAVIES.